March 18, 1941.    H. JOHANNSON    2,235,019
TEMPERATURE COMPENSATING DEVICE
Filed June 17, 1938
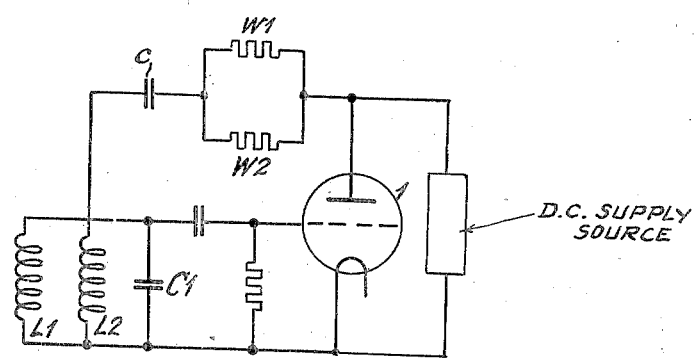
Fig.1
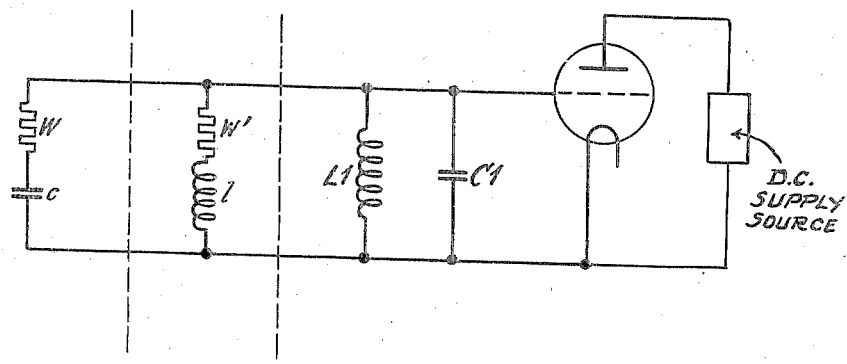
Fig.2.
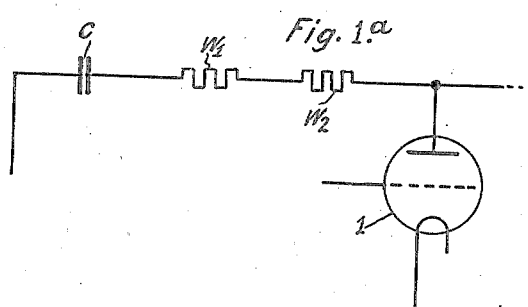
Fig.1ª
Inventor:
Helmuth Johannson
by E. D. Phinney
Attorney Patented Mar. 18, 1941

2,235,019

UNITED STATES PATENT OFFICE 2,235,019

TEMPERATURE COMPENSATING DEVICE

Helmuth Johannson, Berlin, Germany, assignor to C. Lorenz Aktiengesellschaft, Berlin-Tempelhof, Lorenzweg, Germany, a company Application June 17, 1938, Serial No. 214,395
In Germany June 18, 1937

7 Claims. (Cl. 250—27)

The present invention relates to temperature compensating devices, and more specifically to circuit arrangements for compensating temperature changes set up in the surrounding medium of electric devices operating at very low current intensity.

Electrical systems, and particularly low amperage devices operating under strongly fluctuating temperature conditions suffer under the disadvantage that the electrical constants of the circuits are influenced when the surrounding medium is subjected to temperature changes, since either the resistances employed as circuit elements depend upon temperature, or the properties of the insulating material vary in response to temperature changes.

Such temperature influences particularly affect the properties of electronic discharge tubes since either the electron emission becomes unstable, or the interelectrode spaces of the tube vary, from which follows that the tube involves different electrical properties.

It is the object of the present invention to provide means which are adapted to compensate such influences in cases of temperature fluctuations in the surrounding medium. This is accomplished according to the invention by interposing temperature dependent resistances in the circuits affected by temperature changes, and by directly utilizing for compensating purposes the resistance changes set up in response to influences on account of temperature changes in the surroundings. The compensating and temperature dependent resistances are so chosen that changes with respect to their resistance values oppose the changes with respect to the electrical constants of the circuits. Temperature dependent resistances having a high negative temperature coefficient, such as the known uranium dioxide resistances, may preferably be used for this purpose.

The use of this type of resistances as hereinafter disclosed according to the present invention fundamentally differs from the heretofore known application of such resistances where a temperature change in response to a current variation involves the compensating effect. The advantage of this novel arrangement over prior art consists in the possibility of securing compensation also in circuits which conduct currents of extraordinarily low intensity, such as high frequency currents, for example.

The invention will be more readily understood from the following description taken in conjunction with the accompanying drawing, in which—

Fig. 1 shows a wiring diagram according to the invention applied to a transmission gain circuit. Figure 1a is a fragmentary circuit diagram showing a modification of Figure 1; and Fig. 2 shows another wiring diagram adapted to compensate frequency changes set up by temperature variations.

Referring first to Fig. 1 which represents a known thermionic tube transmission gain circuit, the tube I is connected as a regenerative valve detector. The inductance L1 and the capacity C1 form the tuning circuit across the grid circuit of the tube. The feedback is involved by means of the coil L2. It will be assumed that the feedback shall be adjusted to a uniform value in spite of a variable outer temperature. Investigations have proven that the tube tendency of oscillation increases at decreasing temperature of the surroundings, that is, the feedback coupling becomes closer. The explanation of this phenomena is obvious from the reasons heretofore described. A temperature dependent resistor W1 is, according to the invention, connected in the transmission gain circuit and the resistance value change of this resistor in response to fluctuations of the surrounding temperature is utilized for compensating purposes. In case that a resistor is employed which presents a high negative coefficient of temperature, such as an uranium dioxide resistance, the resistance value increases at a decreasing surrounding temperature with the result that the degree of feedback coupling automatically becomes more loose. In order to provide possibilities for adjusting the deleterious and the compensating temperature influences to the same opposing values, a further resistance W2 is shunted across resistance $W^1$ as shown in Figure 1, or the second temperature-dependent resistance $W^2$ may be conencted in series with the compensating resistance W1 as shown in Figure 1a.

The invention is by no means limited to the embodiment above described by way of an example in connection with attenuation compensating circuits, since it is also possible by means of temperature dependent resistances which are influenced by the surrounding temperature to compensate for changes with respect to other values of electrical circuits. For example, the above described resistances may be used for compensating frequency changes in oscillatory circuits which changes are introduced on account of temperature fluctuations. Such compensation is accomplished by the provision of further circuit elements in addition to the above mentioned temperature dependent resistances.

This possibility is shown in Fig. 2. Assuming that the natural frequency of the oscillatory circuit constituted by the inducance $L_1$ and the capacity $C_1$ and connected in the grid circuit of an electronic tube is influenced by temperature changes in the surroundings. Such frequency change is compensated in accordance with a further feature of the invention by means of an additional capacity $c$ or an inductance $l$ coupled to the oscillatory circuit over a temperture dependent resistance W and W', respectively. It is thus possible by accordingly dimensioning these additional elements and by suitably selecting the properties of the temperature dependent resistances W or W' to secure the same but oppositely directed frequency change.

What is claimed is:

1. An electron tube circuit, comprising an electron tube having input and output circuits, direct current supply means for said tube, a high frequency oscillatory network including elements having a positive temperature coefficient included in the input circuit whereby temperature variations tend to produce changes in the tuning of said oscillatory circuit, means including an ohmic resistance having a negative temperature-resistance characteristic coupled to said network to compensate for the changes produced by said temperature variations, and means for blocking the direct current supply potentials for said tube from said ohmic resistance, whereby the changes in tuning are compensated independently of said supply potentials.

2. An electron tube circuit arrangement as set forth in claim 1, in which said temperature dependent ohmic resistance comprises an uranium dioxide resistance.

3. An electron tube circuit comprising an electron tube having input and output circuits, said input circuit including a frequency determining network with feed-back means to couple the output circuit to the input circuit, and means to compensate for the effect of temperature changes of the surrounding medium on the feed-back coupling, the last-mentioned means including an ohmic resistance having a negative temperature-resistance characteristic connected in the feed-back circuit, whereby resistance variations of said resistance in response to changes in the temperature of said medium result directly in compensating variations in said feed-back coupling.

4. An arrangement according to claim 1 in which the said means for blocking the supply potentials comprise a high frequency impedance, connected in circuit with said ohmic resistance across said oscillatory network.

5. An arrangement according to claim 1 in which said ohmic resistance forms part of a compensating network connected across said oscillatory network.

6. An arrangement according to claim 1 further comprising a second ohmic resistance having different temperature-resistance characteristics from those of said first mentioned ohmic resistance, said two ohmic resistances being connected in parallel to each other.

7. An arrangement according to claim 1 further comprising a second ohmic resistance having different temperature-resistance characteristics from those of said first mentioned ohmic resistance, said two ohmic resistances being connected in series with each other.

HELMUTH JOHANNSON.